March 25, 1924.  G. E. HOWELL  1,487,944
SAFETY DEVICE FOR MOTOR VEHICLES
Filed Sept. 10, 1921   2 Sheets-Sheet 1
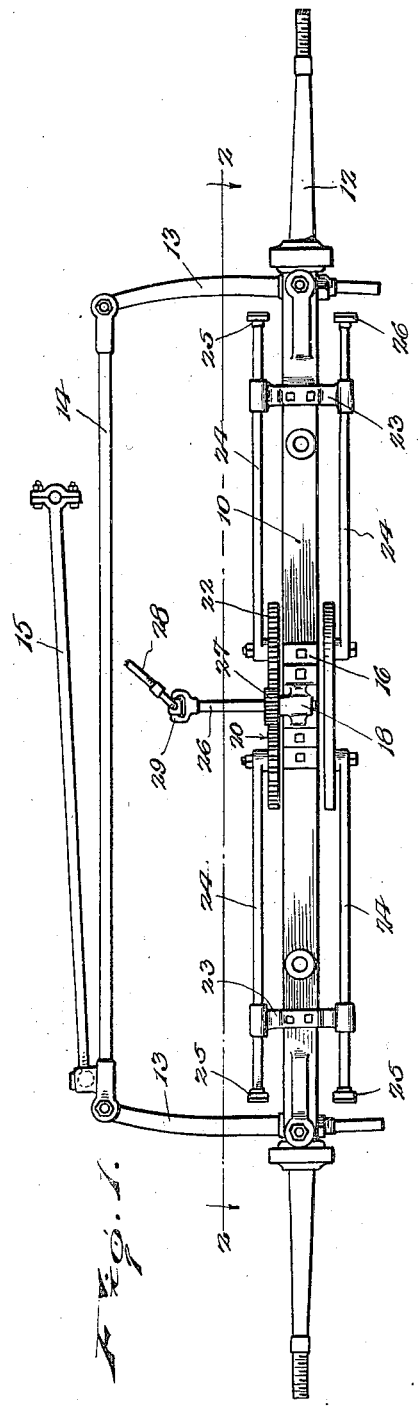
Inventor
G. E. HOWELL
By
Lacy & Lacy, Attorneys March 25, 1924.
G. E. HOWELL
1,487,944
SAFETY DEVICE FOR MOTOR VEHICLES
Filed Sept. 10, 1921
2 Sheets-Sheet 2
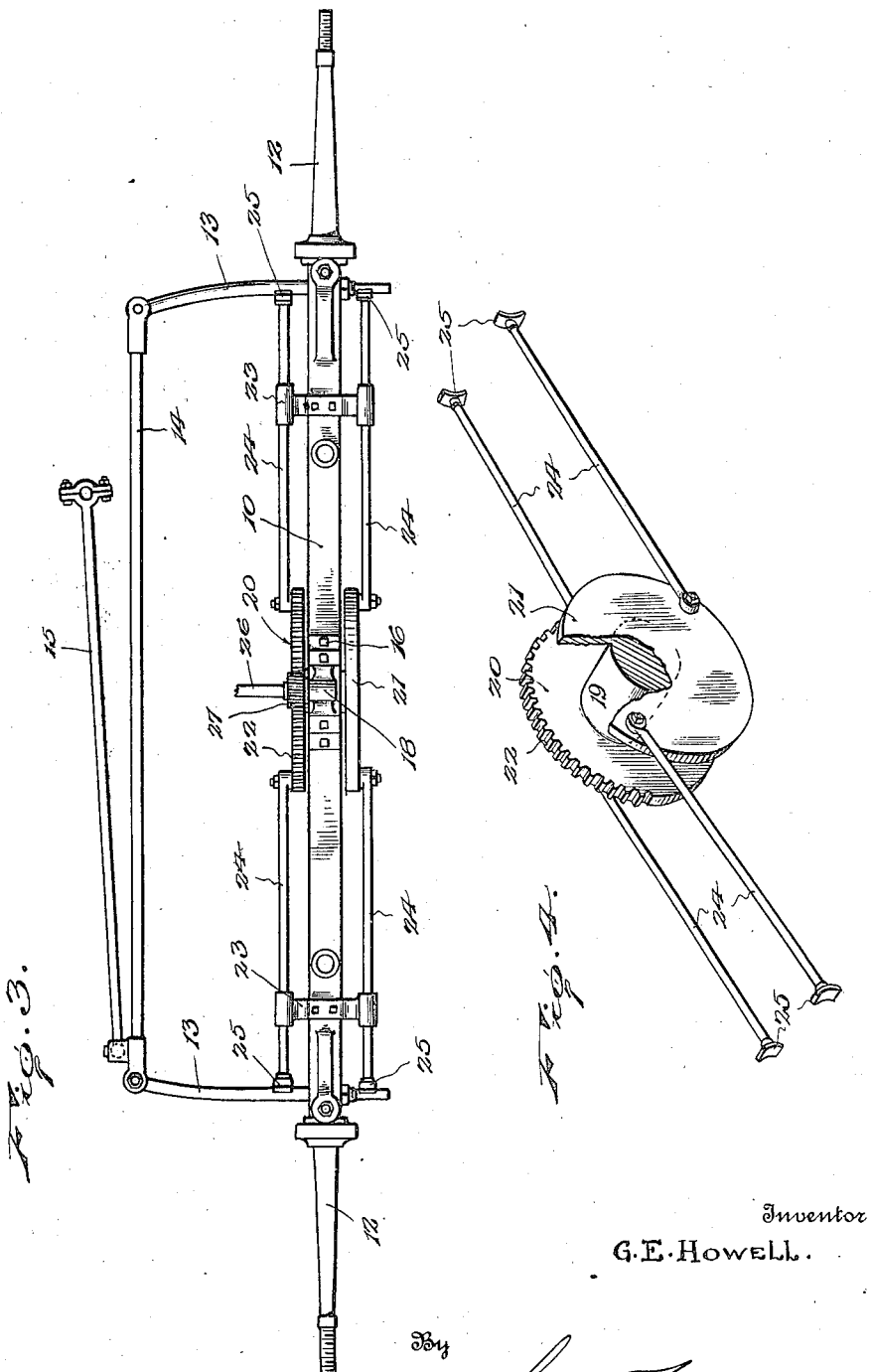
Inventor
G. E. Howell.
By Lacey & Lacey, Attorneys Patented Mar. 25, 1924.

1,487,944

UNITED STATES PATENT OFFICE.

GEORGE E. HOWELL, OF STERLING, ILLINOIS.

SAFETY DEVICE FOR MOTOR VEHICLES.

Application filed September 10, 1921. Serial No. 499,627.

*To all whom it may concern:*

Be it known that I, GEORGE E. HOWELL, a citizen of the United States, residing at Sterling, in the county of Whiteside and State of Illinois, have invented certain new and useful Improvements in Safety Devices for Motor Vehicles, of which the following is a specification.

This invention relates to an improved safety device for motor vehicles and has as one of its principal objects to provide a device whereby the many accidents which now occur through breaking of automobile steering gear may be avoided.

The invention has as a further object to provide a device whereby, when the steering gear breaks, the front wheels of the vehicle may be locked against swinging movement directed straight ahead to thus prevent the vehicle from being overturned.

A still further object of the invention in this connection is to provide a device which, under normal conditions, will prevent the front wheels of the vehicle from being turned too sharply such as very often results in overturning of the vehicle.

And the invention has as a still further object to provide a device which will be characterized by structural simplicity and which may be employed in connection with motor vehicles of substantially any conventional design.

Other and incidental objects will appear hereinafter.

In the drawings:

Figure 1 is a fragmentary plan view showing my improved device in connection with the front axle and associated parts of a motor vehicle, Figure 2 is a sectional view on the line 2—2 of Figure 1, looking in the direction of the arrows, Figure 3 is a plan view showing the device operated to lock the front wheels against swinging movement, and Figure 4 is a detail perspective view showing the locking rods of the device and the actuating disc therefor.

Referring now more particularly to the drawings, I have, for convenience, shown my improved device in connection with the front axle and associated parts of a motor vehicle of conventional design. The axle is indicated at 10 and mounted upon the axle at its ends are the usual steering knuckles 11 from which extend the front spindles 12 of the vehicle which carry the front wheels. In carrying the invention into effect, I employ steering arms 13. These steering arms are appropriately connected with the steering knuckles and are substantially identical with the ordinary steering arms with the exception that the arms 13 project, as particularly shown in Figure 1, in front of the axle 10. Coupling the rear ends of the steering arms 13 is a connecting rod 14 and suitably engaged with said rod is a steering rod 15 designed to be operated from the steering wheel for swinging the steering arms 13 and accordingly directing the front wheels of the vehicle.

Mounted upon the axle 10 at a point substantially midway between the ends thereof is a bearing 16 comprising a bearing cap which is elongated to provide an upstanding bracket 17 upon the upper end of which is formed a second bearing 18. Journaled through the bearing 16 is a shaft 19 upon the opposite ends of which are formed or otherwise secured companion discs 20 and 21 respectively. As will be observed, the disc 20 is formed with gear teeth 22. Bolted or otherwise secured to the axle near the ends thereof are double ended guides 23 and loosely fitting through said guides are pairs of locking rods 24. The outer ends of these guides lie in the plane of the steering arms 13 and are equipped with foot plates 25 engageable with the arms at the front and rear of the axle while the inner end portions of the arms are bolted or otherwise secured to the discs 20 and 21 at oppositely disposed points thereon. Journaled at its forward end in the bearing 18 of the bracket 17 is a control shaft 26 upon which is mounted a pinion 27 meshing with the teeth 22 of the disc 20 and connected with the rear end of said shaft is a control rod 28 extending to the steering post of the vehicle or other point convenient to the driver's seat, a universal joint 29 being interposed between the control rod and the shaft.

As will now be readily understood in view of the preceding description, the vehicle may, under ordinary circumstances, be guided in the usual manner without interference by the present device. However, by turning the control rod 28 and accordingly rotating the shaft 26, the locking rods 24 may, as will be at once appreciated, be adjusted toward the steering arms 13 for limiting the swinging movement of said arms. Accordingly, the front wheels of the vehicle will be prevented from being turned sharply in either one direction or the other to cause possible overturning of the vehicle. The device will, therefore, prove a great safeguard against possible accident through inexperience or carelessness of the driver in so far as concerns proper care in turning the vehicle. Should the steering gear break, the control rod is then immediately operated to shift the locking rod 24 outwardly to abut the steering arms 13. As this is done, the front wheels of the vehicle will be brought to a position directed straight ahead and locked in such position so that overturning of the vehicle will be prevented, the locking of the wheels in such position affording the driver of the vehicle opportunity to stop the vehicle without running off the readway. I accordingly provide a highly meritorious device which may, as will now be appreciated, be employed in connection with motor vehicles of substantially any conventional design and while I have shown the preferred embodiment of the invention, it may be found necessary to make various minor changes therein to meet the requirements of practical installation, as for instance, the substitution of gearing for the universal joint 29. I accordingly reserve the right to all such variations as may fall within the spirit of the appended claims.

Having thus described the invention, what is claimed as new is:

1. A safety device for motor vehicles including steering arms projecting at the front and rear of the front axle of the vehicle, and locking rods shiftable to engage said arms at opposite sides of the axle for locking the front wheels of the vehicle against swinging movement while the vehicle is in motion.

2. A safety device for motor vehicles including steering arms projecting at the front and rear of the front axle of the vehicle, a shaft mounted upon said axle, discs carried by said shafts, one of the discs being provided with gear teeth, guides upon the axle, locking rods slidable through said guides and connected to said discs, a control shaft, and a pinion carried by said shaft meshing with the gear teeth of said disc, the control shaft being operable for rotating said discs and shifting said rods to engage the steering arms for locking the front wheels of the vehicle against swinging movement.

3. A safety device for motor vehicles including steering arms projecting at the front and rear of the front axle of a vehicle, locking means, means operatively supporting the locking means upon the axle, and means connected with the locking means and operable to shift said locking means to engage said arms at opposite sides of the axle for simultaneously locking both of the front wheels of the vehicle against swinging movement while the vehicle is in motion.

4. A safety device for motor vehicles including a shaft mounted upon the front axle of a vehicle and provided with a disc, locking rods connected to said disc, the disc having gear teeth, and a control shaft having a pinion meshing with the gear teeth of said disc, the control shaft being operable for rotating the disc and shifting said rods to engage the steering arms of the vehicle for locking the front wheels of the vehicle against swinging movement.

5. The combination with a motor vehicle having front wheels mounted for swinging movement, and steering gear including steering arms associated with said wheels for swinging the wheels to guide the vehicle, of supporting means mounted upon the vehicle, and means carried by said first mentioned means and operable to engage said arms and lock the wheels against swinging movement in opposite directions without stopping the vehicle when the steering gear breaks and frees said wheels.

In testimony whereof I affix my signature.

GEORGE E. HOWELL, [L. S.]